United States Patent
Proctor et al.

(10) Patent No.: US 7,554,987 B2
(45) Date of Patent: Jun. 30, 2009

(54) QUALITY OF SERVICE MODIFICATION USING A TOKEN IN A COMMUNICATION NETWORK

(75) Inventors: Lee M. Proctor, Cary, IL (US); Gerald J. Gutowski, Glenview, IL (US); Barry J. Menich, South Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 409 days.

(21) Appl. No.: 11/539,942

(22) Filed: Oct. 10, 2006

(65) Prior Publication Data

US 2008/0084887 A1  Apr. 10, 2008

(51) Int. Cl.
  H04L 12/28 (2006.01)
  H04L 12/56 (2006.01)
  H04L 1/00 (2006.01)
  H04L 12/26 (2006.01)
  H04J 3/16 (2006.01)
  H04J 3/22 (2006.01)

(52) U.S. Cl. .................. 370/395.21; 370/252; 370/465

(58) Field of Classification Search ................ 370/252, 370/401, 465, 395.21, 395.2
See application file for complete search history.

(56) References Cited

U.S. PATENT DOCUMENTS

| 6,621,793 | B2 | 9/2003 | Widegren et al. |
| 6,970,422 | B1 | 11/2005 | Ho et al. |
| 7,471,626 | B2* | 12/2008 | Naghian et al. ............. 370/229 |
| 2002/0062379 | A1 | 5/2002 | Widegren et al. |
| 2004/0066764 | A1 | 4/2004 | Koodli et al. |
| 2004/0085949 | A1 | 5/2004 | Partanen et al. |
| 2004/0102182 | A1 | 5/2004 | Reith et al. |
| 2006/0010389 | A1* | 1/2006 | Rooney et al. ............. 715/736 |
| 2006/0056394 | A1 | 3/2006 | Kuure et al. |
| 2006/0072526 | A1 | 4/2006 | Rasanen |
| 2006/0209873 | A1 | 9/2006 | Knabchen et al. |

FOREIGN PATENT DOCUMENTS

WO  WO 2006/059931 A1 *  6/2006

OTHER PUBLICATIONS

Network Systems DesignLine: "Negotiate the world of IP Multimedia Subsystem (IMS) technology", Apr. 12, 2006, http://www.networkssystemsdesignline.com/showArticle.jhtml?printableArticle=true&article, pp. 1-4.

* cited by examiner

*Primary Examiner*—Ronald Abelson
(74) *Attorney, Agent, or Firm*—Brian M. Mancini

(57) ABSTRACT

An apparatus and method is provided for adjusting a Quality of Service (QoS) for a communication device in a communication network. One step includes registering an application from a service provider with the communication device and the communication network. Another step includes receiving, by the communication device, a token from a token provider that permits a modified QoS level for the registered application. Another step includes sending the token by the communication device to the communication network. Another step includes negotiating the QoS level between the service provider and the communication device, dependent at least in part on the reception of the token. Another step includes providing, for the communication device, the modified QoS level permitted by the token for the registered application.

9 Claims, 2 Drawing Sheets

QUALITY OF SERVICE MODIFICATION USING A TOKEN IN A COMMUNICATION NETWORK

FIELD OF THE INVENTION

The present invention relates in general to wireless communication systems and more specifically to Quality of Service (QoS) in a communication network.

BACKGROUND OF THE INVENTION

Today's communication networks can provide differing service levels to a communication device depending on many different criteria. Typically, improved service levels are obtained for an additional charged paid for by the user of the communication device. In general, service levels can be defined as a Quality of Service (QoS) as is well known for a variety of circumstances and mechanics. For example application, a service priority, a particular user, the time of day, RF conditions, handoff conditions, and the like are all circumstances that can be considered in providing a particular QoS level.

The negotiation of QoS up to now has solely been concerned with entities within a particular communication network. For example, a user of a communication device can pay for improved QoS from a service provider of the network. In addition, the communication network can provide an improved QoS to a communication device when it is economical to do so, such as to improve data rate for a specific user when interference is not a concern.

However, it may be advantageous for an external party to the network to negotiate a modified QoS for a communication device of the network. For example, an advertiser that is not part of the network may be willing to negotiate an improved QoS for a user in order to provide an advertisement to a user. The prior art does not address how such a third party may influence a user's QoS level, for this or any other purpose.

Therefore, there is a need for a method and apparatus for a third party, that is external to a particular communication network, to influence a QoS level of a user of the communication network.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE EMBODIMENTS

The present invention provides a method and apparatus for a third party, that is external to a particular communication network, to influence a QoS level of a user of the communication network. In particular, the present invention provides that a user receives a token from a non-network (external) third party source that is exchanged with the user's communication network resulting in a modified Quality of Service (QoS) level. Such modified QoS level typically provides an improved QoS level, but may result in even a degraded QoS level in particular circumstances. As used herein, the definition of QoS includes a change of service priority for a user of the communication network. It should also be recognized that the present invention could be applied to any wireless broadband, Internet, or cellular technology.

Figure 1:
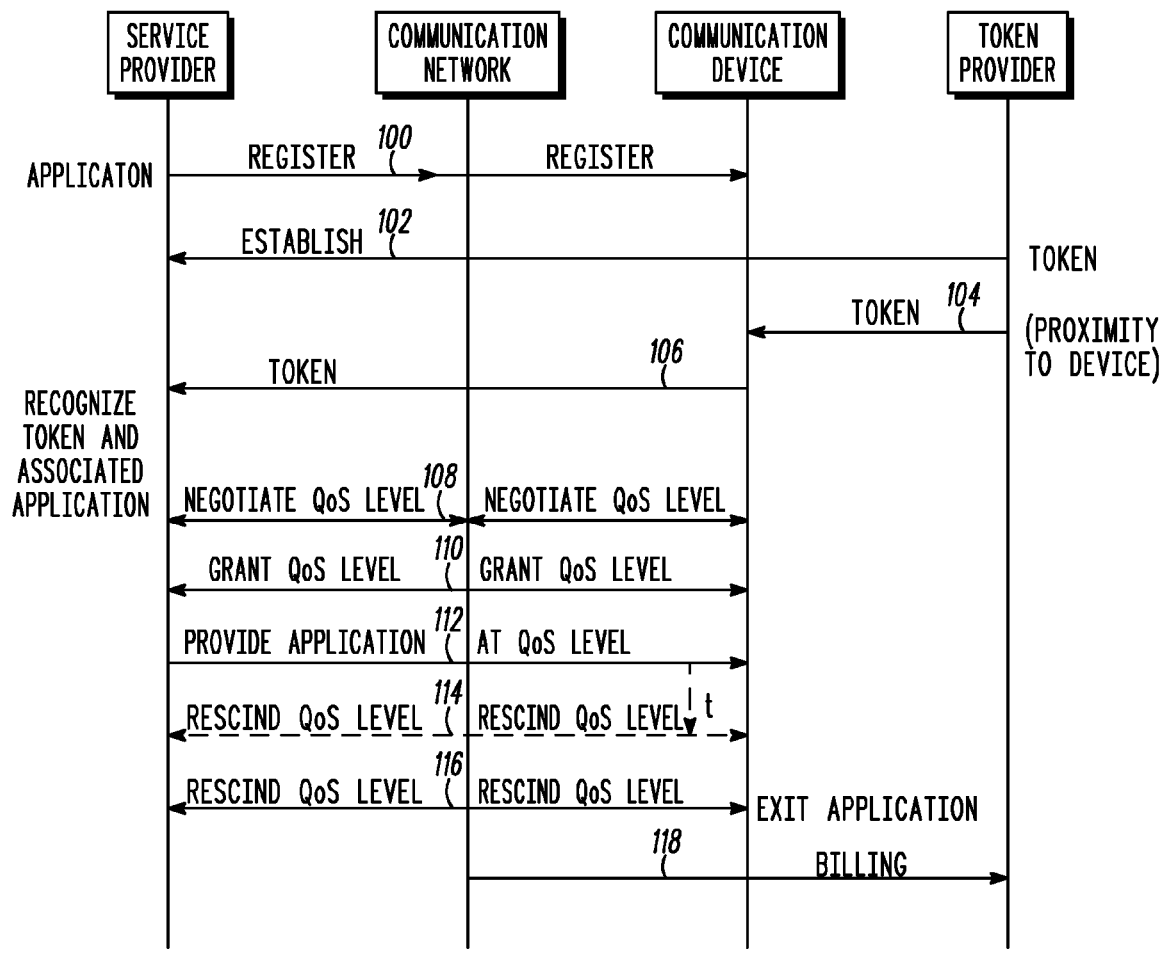
FIG. 1 is a flow diagram illustrating a first embodiment of the invention.

FIG. 1 illustrates a first embodiment of the present invention for a method for adjusting a Quality of Service (QoS) for a communication device in a communication network. A service provider has an application that might be of use, or have information of use, to a user of a communication device. In order to use such application in a communication network it must be registered 100 with the communication network and the communication device. This is done such that the network and device are aware of the availability of the device and of the parameters required to utilize the application on the network.

In accordance with the present invention, a token is used to establish a modified QoS level for a communication device to use the registered application of the service provider. However, for the token to properly operate to activate the modified QoS level for a particular registered application, the token is established 102 for use by the service provider for that application. In this way the service provider recognizes that if this token is ever received by the service provider, it indicates that a third party token provider wants the registered application provided to the requesting user using a modified QoS level. It should be noted that preferably the third party token provider is external to the communication network upon which the communication device is operable, and is an independent entity from the service or application provider. It should also be recognized that the above steps can be performed at any time, and preferably are agreed upon by the service provider and token provider far ahead of time of the use of the token.

After the above establishing steps it may be that a user of a communication device comes upon a token from an operator of an external third party token provider, wherein the communication device of the user receives a token 104 from the token provider that permits a modified QoS level for a pre-identified, registered application. The physical act of receiving the token can occur in many different ways as will be detailed below.

In a next step, the token is sent 106 by the communication device to the service provider. The service provider recognizes the established token and its relationship to an associated application. In particular, the token signifies to the service provider that the third party token provider desires a modified QoS level for the application as provided to the communication device through the communication network.

At this point, the QoS level is negotiated 108 with the network between the service provider and the communication device. It may be that the communication network is unable to grant the modified QoS level, at which point the operability of the present invention becomes moot. In this circumstance, it may be preferable to alert the user that the network is unable to grant utilization of the token at that particular time and that the user may try again later. However, it is envisioned that in most circumstances the modified QoS level will be permitted and granted 110 by the communication network and provided 112 for the registered application as used by the communication device. Optionally, the modification of QoS includes enabling/disabling of the registered application. One circumstance that is envisioned is for the communication network to bill 118 the operator of the token provider for the use of the modified QoS level.

The provided modified QoS level is rescinded upon the occurrence of either the expiration 114 of a pre-determined time limit, t, or upon the communication device exiting 116 the application. The provided modified QoS level can also be rescinded if the communication device or the user of the communication device violates a condition required by the token provider. Moreover, the modified QoS level can be rescinded when the subscriber leaves the service area of the service provider. Alternatively, a "token handoff" can be performed between cooperating systems.

Optionally, the reception of the token by the communication device is location-based, such that only a communication device associated with a pre-defined location is provided a modified QoS level. For example, the token can be received on a short-range wireless communication from a token provider proximal to the communication device. In another example, the user can come upon local instructions for manually entering the token code in the communication device. In yet another example, the token provider is provided at a location where the application can be accessed by the communication device. If the user and/or communication device moves out of the vicinity of the token provider, the token is no longer valid and the modified QoS level is rescinded.

Figure 2:
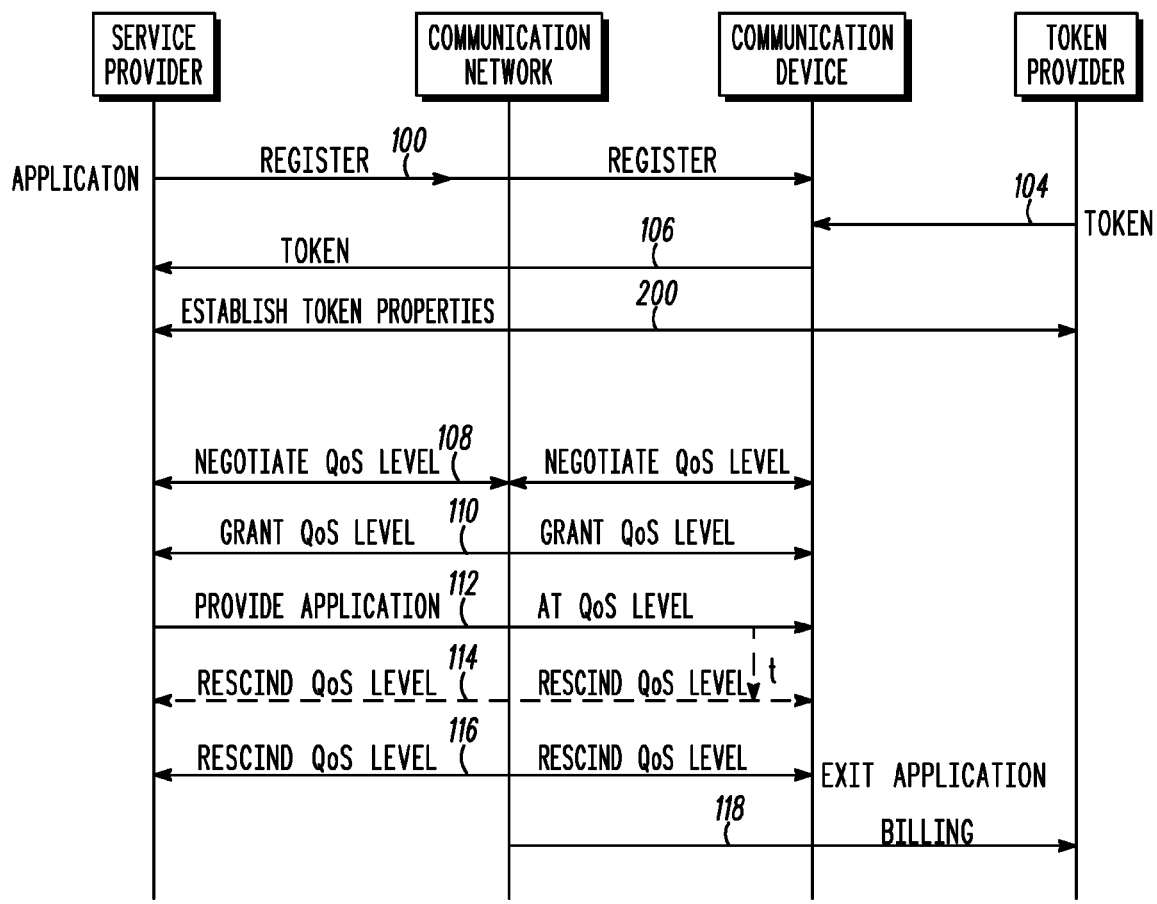
FIG. 2 is a flow diagram illustrating a second embodiment of the invention.

FIG. 2 illustrates a second embodiment of the present invention for a method for adjusting a Quality of Service (QoS) for a communication device in a communication network. As before, the service provider has an application that might be of use, or have information of use, to a user of a communication device. In order to use such application in a communication network it must be registered 100 with the communication network and the communication device. This is done such that the network and device are aware of the availability of the device and of the parameters required to utilize the application on the network.

It may be that a user of a communication device then comes upon a token from an operator of an external third party token provider, wherein the communication device of the user receives a token 104 from the token provider that permits a modified QoS level for a pre-identified, registered application from a service provider. The physical act of receiving the token can occur in many different ways as will be detailed below. In this embodiment, the service provider has no pre-established arrangement with the operator of the token provider. The token code can identify the token provider or operator thereof, such that the service provider can communicate with the token provider or operator thereof to establish the desired modified QoS level and other parameters for the communication device to use the registered application of the service provider.

Therefore, the service provider contacts the token provider or operator thereof to properly establish 200 the desired modified QoS level to be used for a particular registered application for the communication device. It should be noted that preferably the third party token provider is external to the communication network upon which the communication device is operable, and is an independent entity from the service or application provider.

This second embodiment then proceeds with the negotiating, granting, rescinding, and billing procedures as previously described with respect to the first embodiment, and which will not be repeated for the sake of brevity.

In practice, the token provider in either of the above embodiments can take many forms. In one instance, the token provider can be an RFID tag that provides a token code to a proximal communication device having an RFID reader, such as for a cellular radiotelephone for example. In this case, the token can be loaded automatically. Similarly, in another example the token provider can be a communication unit operable on a short-range wireless communication system, wherein the token can be uploaded automatically to a communication device operable to communicate on the short-range wireless communication system. In another example, the communication device can be a computer or other similar device, wherein the token provider is a webpage on the Internet. In this case, the token is a soft copy and the communication network is the Internet, and the token is manually or automatically passed to an application (service) provider on the Internet. Alternatively, the token can be provided from a hard copy such as a promotional flyer or sign, wherein a user manually enters the token into the communication device, such as a computer, PDA, cellular telephone, or the like. It should be recognized that there are many ways for a token to be entered into a communication device, and that the present invention encompasses all of these techniques.

EXAMPLE 1

A third party has an agreement with a service provider to provide better QoS to certain users (typically on a location basis). The users are identified on a temporary basis by a third party issued token. The user could receive the token on a promotional flyer and enter the token manually. However, the preferred approach is to receive the token without any user involvement via a short range wireless technology (e.g. RFID tag read by a RFID tag reader coupled with the communication device, a barcode read by a barcode scanner coupled with the communication device, a Bluetooth device coupled to the communication device, etc). It is envisioned that this differentiated service could be a revenue generator for the service providers, who would charge the third party for the enhanced services. The third party would in turn use it to provide better service to users in their business, such as a coffee shop, etc. Note that the third party is not part of the communication network and does not own any of the communication access equipment.

EXAMPLE 2

An Internet webpage can provide users with the token on their communication device such as a computer, PDA, cellular telephone, and the like. The token would be exchanged with the user's communication network to provide improved QoS for a certain length of time or while browsing the original website. The website would either prepay or postpay the user's communication network provider for the use of the token.

EXAMPLE 3

In this example, an improved QoS is provided for a certain set of users based on their location within a wireless broadband footprint. For example consider an access point on a train or airplane. The transportation carrier wishes to provide improved QoS to their first class passengers. Although the carrier owns the access point, they do not want to deal with directly entering a list of user devices. Thus the users receive a token automatically, e.g. from an RFID on their ticket, frequent flyer card, or embedded in the first class seats.

As a result, the present invention provides a seamless technique to provide further information of interest to a user while generating a revenue stream for a service provider and/or communication network. The user also benefits as the techniques used are unobtrusive and free to that user.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for adjusting a Quality of Service (QoS) for a communication device in a communication network, the method comprising the steps of:
    registering an application from a service provider of the communication network with the communication device and the communication network;
    establishing a token associated with the registered application by the service provider, wherein the token permits a modified QoS level for the registered application;
    receiving, by the communication device, the token from a token provider outside of the communication network, the token provider being an independent entity from the service provider;
    sending the token by the communication device to the service provider;
    negotiating the modified QoS level for the communication device, dependent at least in part on the reception of the token, between the service provider and the token provider;
    providing by the service provider, for the communication device, the modified QoS level for the registered application, and
    billing the operator of the token provider for the use of the modified QoS level by the communication device.

2. A method in accordance with claim 1, wherein the token provider is an RFID tag that provides a token code to a proximal communication device having an RFID reader.

3. A method in accordance with claim 1, wherein the receiving step includes a user manually entering the token into the communication device.

4. A method in accordance with claim 1, wherein the token provider is a communication unit operable on a short-range wireless communication system.

5. A method in accordance with claim 1, wherein the token provider is a webpage on the Internet.

6. A method in accordance with claim 1, wherein the token provider is provided at a location where the application can be accessed by the communication device.

7. A system for adjusting a Quality of Service (QoS) for a communication device in a communication network, the system comprising:
    a service provider of the communication network, the service provider registering an application with the communication device and the communication network;
    a token provider that is external to the communication network and an independent entity from the service provider;
    an application from the service provider that is registered with both the communication device and communication network, wherein the service provider establishes a token associated with the registered application for use in the communication network; and
    a token provided by the token provider and sent to the service provider by the communication device, the token permits a modified QoS level on the communication device for the registered application, whereupon the service provider negotiates the modified QoS level for the communication device, dependent at least in part on the reception of the token, between the service provider and the token provider, and
    wherein the service provider grants the use of the registered application at the modified QoS level for the communication device, and the communication network bills the operator of the token provider for the use of the modified QoS level by the communication device.

8. The system in accordance with claim 7, wherein the modified QoS level is rescinded upon meeting predetermined criteria.

9. The system in accordance with claim 7, wherein the token is location-based, such that only a communication device associated with a pre-defined location is provided a modified QoS level.

* * * * *